(12) United States Patent
Demers

(10) Patent No.: US 6,179,033 B1
(45) Date of Patent: Jan. 30, 2001

(54) METHOD AND APPARATUS FOR SEATING TUBELESS TIRES

(76) Inventor: Norman P. Demers, P.O. Box 4010, Manchester, NH (US) 03108-4010

(*) Notice: Under 35 U.S.C. 154(b), the term of this patent shall be extended for 0 days.

(21) Appl. No.: 09/303,698

(22) Filed: May 3, 1999

(51) Int. Cl.[7] .................................................. B60C 25/12
(52) U.S. Cl. ........................ 157/1.17; 157/1.2; 137/223; 251/63.5
(58) Field of Search ................ 157/1, 1.17, 1.2, 157/1.22; 251/63, 635; 137/223

(56) References Cited

U.S. PATENT DOCUMENTS

| | | |
|---|---|---|
| 3,866,654 | 2/1975 | Dusquesne . |
| 3,942,575 * | 3/1976 | Blomgren, Sr. et al. ....... 157/1.17 X |
| 4,694,875 * | 9/1987 | Goebel ............................ 157/1.17 X |
| 5,042,547 | 8/1991 | Van De Sype . |
| 5,056,576 * | 10/1991 | Iori ..................................... 157/1.17 |
| 5,072,764 | 12/1991 | Ochoa . |
| 5,072,765 * | 12/1991 | Kane et al. ....................... 157/1.2 X |
| 5,456,302 | 10/1995 | Demers . |

OTHER PUBLICATIONS

Bead Seater Corp., "The Bead Seater" Brochure, see enclosed.*

* cited by examiner

Primary Examiner—David A. Scherbel
Assistant Examiner—Anthony Ojini

(57) ABSTRACT

A method and apparatus for bead seating a tubeless tire onto a rim. Air stored in a portable tank is released as a single pneumatic pulse having an extremely fast rise time. This is accomplished using a charging reservoir having a fill/quick-release port, an inlet and an outlet. A piston divides the charging reservoir into two sections, a control section containing the fill/quick-release port and an outlet section containing the inlet and the outlet. The portable tank is connected to the inlet of the outlet section. Air that is introduced into the fill/quick-release port fills the control section of the charging reservoir. Since the piston is a loose fit, air is able to slowly leak past the piston and fill the outlet section of the charging reservoir and the portable tank that is connected to the inlet. The pressure differential across the piston keeps the piston tightly against the outlet, holding the pressurized air in the outlet section and the portable tank. Once the pressurized air in the quick-release section is released, the pressure differential is reversed and the piston is propelled away from the outlet, thereby explosively releasing the air from outlet section and the connected portable tank as a single pneumatic pulse. The pneumatic pulse is directed between the rim of the wheel and the bead of the tire by a unique nozzle to seat the bead of the tire.

18 Claims, 2 Drawing Sheets

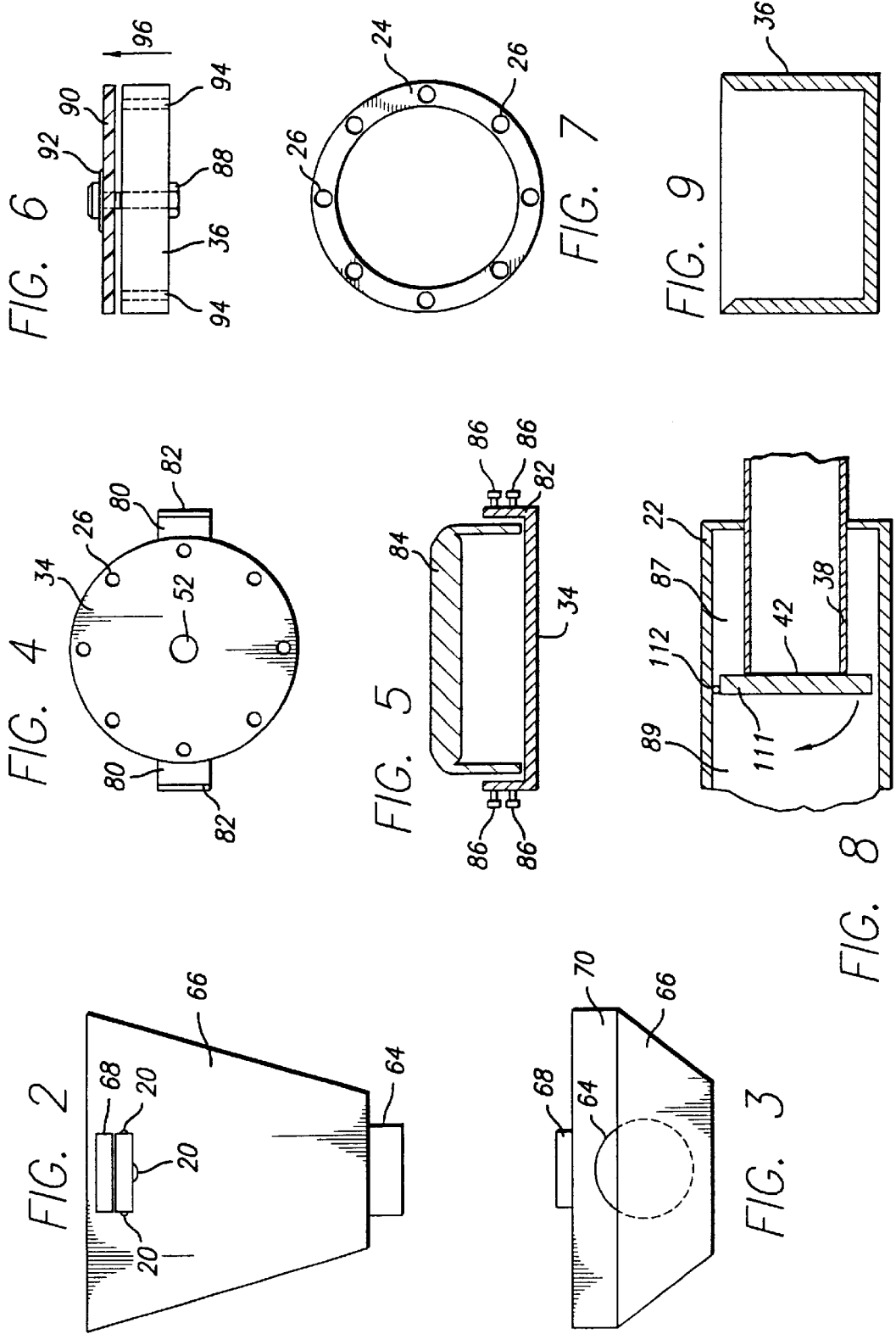

METHOD AND APPARATUS FOR SEATING TUBELESS TIRES

BACKGROUND OF THE INVENTION

1. Field of the Invention

The invention relates to a method for bead seating a tubeless tire onto a rim and an apparatus for the same.

2. Description of the Related Art

While tubeless tires provide significant advantages over the tube-type, it is extremely difficult to seat the bead of the tire on the rim. This difficulty creates a special problem when trying to change a tire on the road, far from the customary equipment used to seat the tire.

One solution to the problem had been the introduction of ether inside the tire. The ether is the ignited and the resulting explosion often will seat the bead of the tire on the rim of the tire. Of course, determining the precise amount of ether necessary to seat the tire without potential injury to the operator is often difficult to determine. Factors such as the volume of the tire, the relative humidity in the air, ambient breeze, volume of ether are virtually impossible for the operator to calculate in order to be reasonably certain that sufficient ether is being used. However, if too much ether, again virtually impossible to consistently determine, is used, then a dangerous explosion is possible. Although extremely dangerous and despite the warning by every tire manufacturer that this procedure should not be used, this method is still being employed even though a number of deaths and serious injury result each year.

Another solution, which is best described as mechanical, although it may include some pneumatic elements, relies on the use of flexible straps or segmented hoops which squeeze along the circumference of the tire and thereby force the bead upward toward the bead seating surface. These mechanical devices are not conducive to being portable and require a substantial amount of time in the preparation of the equipment prior to the inflation process.

Still another solution is a class of pneumatic tools, which utilize a source of compressed air to impart momentum to the bead and inject air into the tire, thereby initiating a progressive bead seating process. While these tools are substantial improvement over the above-described apparatus, this type of design still presents problems and, as yet, no pneumatic tool has been universally adopted or totally eliminated the practice of using ether.

U.S. Pat. No. 3,866,654, issued to Duquesne on Feb. 18, 1975, discloses a portable device for inflating tubeless tires that utilizes a source of compressed air stored within a tank which directly supplies an injection nozzle through a long flexible hose. A complicated valve is used for releasing the air stored within a portable tank to control the airflow. The device is expensive to construct, especially due to its complicated valve assembly and cannot release enough air in a sufficiently short period of time so that the bead of the tire will be forced against the rim to properly seat the bead. The inadequacy of this device to meet tire bead seating requirements is primarily due to its cumbersome valve as well as the use of a relatively long flexible standard compressed air hose.

U.S. Pat. No. 5,042,547, issued to Van De Sype on Aug. 27, 1991, discloses a tire bead seating device having multiple air injection nozzles. Four are depicted which direct air from a portable tank. Van De Sype recognized the need for using a simple valve, a ball valve, that permits faster release of the air than was achievable with Duquesne's disclosed valve. However, Van De Sype defeated any advantage gained by the use of the ball valve by requiring multiple flexible long flexible lines having small nozzles. This arrangement substantially increases the airflow resistance downstream of the ball valve, thus correspondingly slowing the rise time of the air released against the bead of the tire and subsequently, reducing the impact on the bead of the tire.

U.S. Pat. No. 5,072,764, issued to Ochoa on Dec. 17, 1991, discloses, as did Van De Sype, a bead seating apparatus that utilizes a hand-operated valve, preferably a ball-type valve, to release a charge of air from a portable storage tank. However, Ochoa, while recognizing the need for a very fast discharge of air from the storage tank, failed to recognize that his nozzle is unnecessarily restricting airflow. Ochoa teaches the use of a nozzle having a discharge area that is less than the cross-sectional area of the discharge barrel. Ochoa also teaches away from the use of large diameter discharge barrels, that is, discharge barrels having an opening larger than 20.4 square centimeters. Ochoa incorrectly states that larger dimensions of discharge barrels tend to cause the discharge impulse of air to impart an undesirably large quantity of momentum to the sidewall of the tire, thereby introducing undesired components into the motion of the bead of the tire. Consequently, much of the advantage gained by the use of a short, rigid, discharge short discharge barrel is lost. Ochoa failed to recognized that the time its takes for the ball valve to be moved from the fully closed to the fully opened position retards the rise time of the pulse of air, thus reducing the effectiveness of the apparatus.

An improvement on the Ochoa device is a tire bead seating apparatus that was manufactured by the BEAD SEATER Corporation. This device also featured a portable tank, a ball-type valve as taught by Van De Sype, Ochoa and a short, rigid discharge barrel as disclosed by Ochoa. However, the BEAD SEATER apparatus provided a unique fan-shaped nozzle having a radius that was dimensioned to correspond to the rim of the tire and had a discharge area that was always greater than cross-sectional area of the discharge barrel. While the nozzle as well as the use of discharge barrel larger than taught by Ochoa resulted in substantially improves performance over its predecessors. However, this device was still limited by the use of the ball-type valve.

U.S. Pat. No. 5,456,302, issued to Demers on Oct. 10, 1995, discloses a tire bead seating apparatus that eliminates the use of discharge barrel and its corresponding valve. This results in the pulse of air having a substantially faster pressure rise time than is found with above-referenced devices. This device makes use of piston that is releasably sealed against the outlet of the portable tank such that the piston is held against the tank outlet by having an air pressure that is higher on the side away from the outlet than is found on the side adjacent to the outlet. Once the air is released on the side of the piston away from the outlet via a quick release valve, the piston moves away from the outlet of the tank, allowing the air inside the tank to be released. The air flows from the tank and is immediately discharged out the discharge nozzle.

This device is substantially more effective than previous attempts due to the substantial faster response time and the further reduction in airflow resistance. However, the design suffers from having a higher cost of manufacture than the Ochoa or BEAD SEATER devices. By having an integral nozzle, this device exhibits an appreciable kickback, especially if the tank is filled to a higher pressure such as 100 lbs/in$^2$. Further, the device is particularly sensitive to even small leaks since the volume of air on side of the piston away from tank outlet is very small compared to the volume of air in the tank. Once a small amount of air leaks, the pressure differential across the piston can easily be lost, thus preventing the piston from releasing sufficiently quickly to produce the desired very fast pressure rise time of air that is necessary to efficiently seat the bead of the tire.

A device that is inexpensive to produce, relatively insensitive to leaks, substantially reduces or eliminates kickback, and still provides the extremely fast release of air from the reservoir tank is not found in the prior art.

SUMMARY OF THE INVENTION

It is an aspect of the invention to provide a tire bead seating apparatus that has the least restrictive passage-way for the air charge stored within a tank to proceed to the tire that is to be seated.

It is another aspect of the invention to provide a tire bead seating apparatus that can be activated without the use of a ball-type valve or gate valve and without the use of a conduit or discharge barrel.

It is another aspect of the invention to provide a tire bead seating apparatus that is adaptable to a wide range of truck tire sizes and manufacturers, including those having the most difficult tire beads to seat.

It is still another aspect of the invention to provide a tire bead seating apparatus which is portable and can be easily stowed.

Another aspect of the invention is to provide a tire bead seating apparatus that can be manufactured inexpensively from readily available parts.

Still another aspect of the invention is to provide a tire bead seating apparatus that is insensitive to leaks so that high tolerances between parts are unnecessary.

It is another aspect of the invention to provide a tire bead seating apparatus that substantially eliminates or reduces kickback by using a specially designed nozzle that corresponds to the air releasing assembly of the invention.

Finally, it is an aspect of the invention to provide a tire bead seating apparatus that can be activated by a push button so that the operator can easily activate the device with one hand.

The invention is an apparatus for seating the bead of a tubeless tire on rim. A charging reservoir having a predetermined cross-sectional area is provided. Said charging reservoir is also provided with a fill/quick-release port, an inlet and an outlet. An inflation tank having a predetermined volume and an inlet/outlet is provided, wherein the inlet/outlet of said inflation tank is connected to the inlet of said charging reservoir. Moveably disposed within said charging reservoir is a piston. When said charging reservoir and said inflation tank is pressurized with air via the fill/quick-release port of said charging reservoir, said piston is moveably urged against the outlet of said charging reservoir. Once in this position, the pressurized air in said charging reservoir and said inflation tank is substantially prevented from exiting the outlet of the charging reservoir. When the pressurized air within said charging reservoir is quickly released via the fill/quick-release port of said charging reservoir, said piston substantially instantaneously moves away from the outlet of said charging reservoir. Then, the pressurized air stored in said inflation tank is explosively released through the outlet of said charging reservoir.

A nozzle having an inlet and an outlet is provided. The inlet of said nozzle is connected to the outlet of said charging reservoir. The cross-sectional area of the outlet of said nozzle corresponds to the inlet of said nozzle as well as the outlet of charging reservoir. When the pressurized air from said inflation tank is released, the air passes into the inlet of said nozzle and exits the outlet of said nozzle so that the airflow is directed between the bead of the tire and the rim, thereby seating the tire on the rim.

The above and further objects and advantages of the present invention will become apparent from the description contained hereinafter in combination with the accompanying illustrative figures.

BRIEF DESCRIPTION OF THE DRAWINGS

FIG. 2 is a top view of the nozzle.

FIG. 3 is a front end view of the nozzle.

FIG. 4 is rear view of the charging reservoir head plate.

FIG. 5 is a top detailed view of the preferred embodiment of the charging reservoir head plate.

FIG. 6 is a side view of an alternative embodiment of the piston.

FIG. 7 is an end view of the charging reservoir flange.

FIG. 8 is a side view of an alternative embodiment for controlling the outlet.

FIG. 9 is a cross-sectional view of another alternative embodiment of the piston.

DETAILED DESCRIPTION OF THE INVENTION

Figure 1:
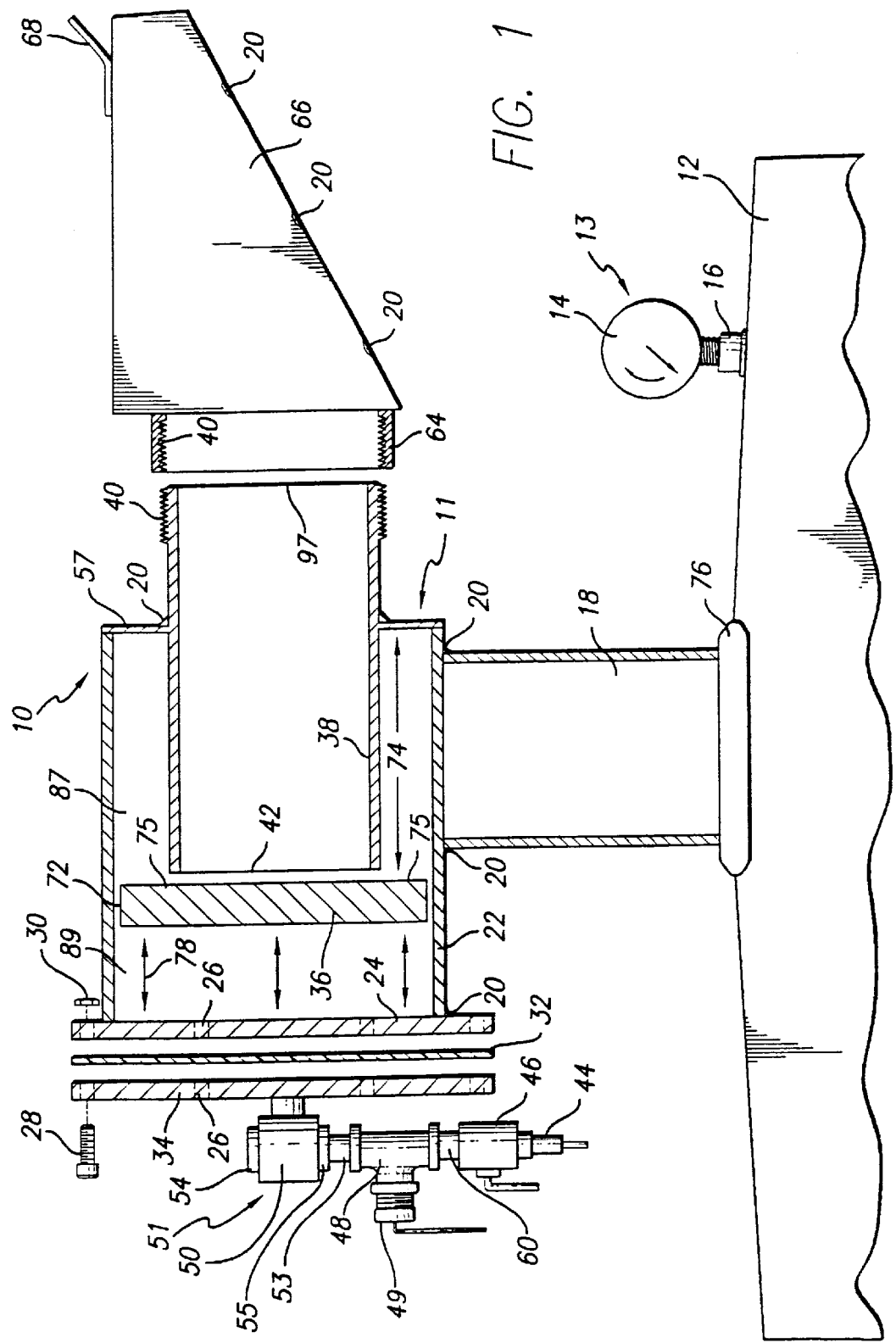
FIG. 1 is a partial cut-away side view of the apparatus for seating the bead of a tubeless tire in accordance with the invention.

FIG. 1 is a partial cut-away side view of invention 10. An inflation tank 12 is preferably a pressure vessel having a capacity of at least 1500 cubic inches and a capability of storing air at pressures of at least 125 lb/in. While ASME approved tanks should be used wherever possible, non-rated tanks which meet the specifications provided herein are also acceptable for use as inflation tank 12. The actual size and pressure rating of inflation tank 12 will vary according to the size of the tire to be sealed and to the pressure of the air stored therein. The preferred size of tank 12 specified will enable the user to seat the beads of most standard truck tire sizes.

The parts and specifications cited for the preferred embodiment disclosed herein are dimensioned to accommodate typical truck tubeless tires. Substantially smaller tires could obviously be seated with the preferred size specified, however, dimensions and sizes of the parts could be reduced accordingly to meet smaller tire requirements. Substantially larger tires may also be seated with specified apparatus, however, the air pressure within the unit may have to be adjusted accordingly as long as safe limits were not exceeded. The dimensions and parts of the apparatus could be scaled upward to meet the requirements of tires substantially larger than typical truck tires if so desired.

Invention 10 is easily maneuvered and transported by a handle (not shown) attached to the exterior of inflation tank. Another handle 84 is attached to charging head plate 34 which is shown in detail in FIGS. 4 and 5.

Attached to inflation tank 12 is relief assembly 13, including a pressure gauge 14 which is provided to display the internal air pressure of inflation tank 12. A pressure relief valve (not shown) that is well known in the art, preferably rated 150 psi, is provided to prevent over-inflation and to release the excess pressure within inflation tank 12. Relief assembly 14 is connected to inflation tank 12 via nipple 16. Relief assembly 13 is shown for the sake of clarity opposite to fill/quick-release assembly 51. However, relief assembly 14 is preferably placed on inflation tank 12 under fill/quick-release assembly 51 so that both structures may be protected from damage during use by handle 84.

As shown in FIG. 1, fill/quick-release assembly 51 is attached to invention 10 by way of a threaded on end (TOE) nipple 52 which is connected to the charging head plate 34. Nipple 52 is preferably ⅜ inch sized fitting. Attached to nipple 52 is quick release valve 50 such as manufactured by Deltrol of Bellwood, Ill., model EV 24 A2. However, any type of valve which permits the air to be very rapidly exhausted from charging reservoir 22 could be also be used. Further, the inventor has found that a ⅜ inch or larger ball-type of valve could be substituted for quick release valve 50. However, the performance of invention 10 will be degraded somewhat due to the slower rise time found with this type of design as discussed above.

Exhaust port 54 is left open so that exiting air is not restricted when valve 50 is actuated. Attached to the other port of quick release valve 50 is a ⅜ inch by ¼ inch bushing 55. Attached to bushing 55 is ¼ inch close nipple 53. A "T" 48, also ¼ inch, is then attached to nipple 53. Attached to one port of "T" 48 is discharge trigger 49 such as sold by TRAMEC, part number 35000. Attached to the remaining port of "T" 48 is ¼ inch street elbow 60. Note that elbow 60 is not shown turned at a 90 degree angle for the sake of clarity. Attached to elbow 60 is ¼ ball valve 46. Assembly 51 is completed by attaching air coupler 44 to ball valve 46.

FNPT Spud 76 is sized to accommodate nipple 18 and is welded to inflation tank 12 as shown. Inflation assembly 11 is then attached inflation tank 12 via 2 inch TOE nipple 18 which is screwed into spud 76. The other end of nipple 18 is then welded to outlet section 87 of charging reservoir 22 via welds 20. Nipple 18 is preferably about five inches long.

Inflation assembly 11 comprises charging reservoir 22, outlet nipple 38, and piston 36. The wall thicknesses and materials for the parts described below are not critical provided the parts are able to withstand the pressures that will be experienced and meet government safety requirements. Also, the dimensions specified can be scaled upwardly or downwardly to correspond to the sizes of tires that are to be seated.

The end of outlet section 87 of charging reservoir 22 is closed off via end plate 57 which is fitted with an opening so that outlet nipple 38 is within the outlet section 87 of charging reservoir 22. While outlet nipple 38 is shown substantially axially centered within end plate 57 and charging reservoir 22, nipple 38 could also be offset within charging reservoir 22. Nipple 38 is welded via welds 20 to end plate 57 and end plate 57 is, in turn, welded to one end of charging reservoir 22 to complete the closure at that end. Note that outlet nipple 38 is also positioned with the threaded end 40 outside of assembly 11 and so that end 42 of nipple 38 is about ¼ inch beyond the opening provided by nipple 18. In this manner, when piston 36 is urged against end 42 of nipple 38, piston 36 substantially closes off the control section 89 from the outlet section 87 of charging reservoir 22 thus positioning piston 36 away from the opening provided by nipple 18 which is connected to the outlet section 87.

In order that a tight seal is provided when piston 36 is urged against end 42 of nipple 38, end 42 is smoothed by any suitable method such as machining, sanding, etc. Both nipples 38 and 18 are preferably made of steel and about 5 inches long with a wall thickness of approximately 3/16 inches.

Attached to threads 40 of nipple 38 is nozzle 66. Referring now to FIGS. 2 and 3 as well as FIG. 1, nozzle 66 is shown in detail. The inventor has discovered that if invention 10 is discharged without nozzle 66 in position, then the apparatus exhibits substantial kickback as if the user were discharging a firearm. However, the use of nozzle 66 substantially reduces if not eliminates kickback so that the apparatus can held comfortably.

Nozzle 66 is preferably fabricated from sheet steel by folding and spot welding at welds 20. A 2 inch half-coupling 64 with internal threads 40 is provided so that nozzle 66 can be screwed onto external threads 40 of nipple 38. Nozzle 66 is designed so that discharge opening 70 has a cross-sectional area that is preferably greater than or equal to the cross-sectional area of nipple 38. If discharge opening 70 is approximately ¾ inches wide and 6 inches long, this will meet that requirement. However, smaller sized openings for discharge opening 70 can be used as long as the decrease in performance is acceptable. However, the cross-sectional area of discharge opening 70 should always be greater than or equal to 70% of the cross-sectional area of the outlet opening 97 of charging reservoir 22.

If the preferred dimensions are utilized, nozzle 66 will not present any impediment to the charge of air as it exits through opening. Nozzle 66 is completed by welding a u-shaped rim guide 68 to the top of nozzle 66 via welds 20. Rim guide 68 serves to position discharge opening 70 between the bead of the tire and rim of the wheel so that bead of the tire can be seated. Also, since nozzle 66 is threaded onto is nipple 38, nozzle 38 may be turned as desired by a user to facilitate seating the bead of tire when the tire is placed in different positions relative to the user. The other end of charging reservoir 22 is closed via flange 24 which is welded to that end of charging reservoir 22 via welds 20. As shown in FIG. 7, flange 24 is provided with circumferential holes 26 which serve to bolt via bolts 28 and nuts 30, head plate 34 onto charging reservoir 22. Gasket 32 is placed between flange 24 and head plate 34 to seal against leaks. Eight holes 26 are shown, however, more or less could be used as long as charging reservoir 22 is reasonably sealed.

Note that small leaks at this juncture or any other place in the unit are not critical since pressurized air is meant to be stored in inflation tank 12 for only a short period of time, generally, minutes. As noted above, it is an aspect of the invention to be relatively insensitive to air leaks over the short time. Since the preferred embodiment of piston 36 permits air flow to leak past the piston 36 in either direction, any small amount of air which might leak from control area 89 will be replenished from outlet area 87 and storage tank 12. In this manner, essentially the same pressure will be kept within the control area 89, outlet area 87 and storage tank 12 so that the release performance of piston 36 will not be degraded over the short term.

In fact, it is preferable not to have invention 10 sealed too tightly, since the unit might be stored in a charged condition which is undesirable for safety considerations. Therefore, it is preferable to have one or more small leaks so that the unit will discharge completely within an hour or so, to prevent storage of the apparatus with a pressurized tank of air.

As shown in FIGS. 4 and 5, head plate 34 provides matching holes 26 so that head plate 34 may be bolted onto flange 24. Ears 80 extend beyond head plate to serve to provide a point of attachment for handle 84. Ears 80 are preferably fabricated as part of head plate 34 but ears 80 could also be attached separately. Flange 82 is bent upward from ears 80 which provides two holes through handle 84 may be bolted via bolts 86. Only one bolt 86 on each side of ears 80 is fastened during shipping the apparatus so that handle 84 may be easily folded to fit within a smaller profile shipping carton. As noted above, once both bolts 86 are in place, handle 84 serves also to protect inflation assembly 11 and relief assembly 13 from being damaged during use.

Referring again to FIG. 1, charging reservoir 22 is preferably a piece of steel pipe about 5 ¼ inches long and 3 ¾ inches OD. This provides an ID measurement for charging reservoir 22 of about 3.510 inches. Corresponding to the dimension of charging reservoir 22, piston 36 should be 3 ½ inches in diameter. This provides clearance 72 of approximately 10 thousandths. This clearance is sufficient to enable the pressurized air that is introduced via nipple 52 to charging reservoir 22 to fill inflation tank 12 and the outlet section 87 of charging reservoir 22 by leaking past piston 36 through clearance 72. However, since this opening is so small compared to the two inch opening provided by nipple 18 when piston 36 moves away from end 42 of outlet nipple 38, substantially all of the air in inflation tank 12 is released through outlet nipple 38 and only a very small amount back through clearance 72. Of course, if piston 36 configured to permit air to flow in only one direction, no air would flow back into control section 89 once piston 36 is propelled away from end 42 of nipple 38.

While charging reservoir 22, nipple 38, and piston 36 are shown as having a circular cross-section, this is not critical. Other shapes, such as square or rectangular, oval, etc. could be substituted. As shown in FIG. 8, the use of rectangular shape would enable the use of a control member 111 hinged on one side via hinge 112 rather than using a piston to close off the end 42 of outlet nipple 38. Hinge 112 is preferable any of the various "piano-type" hinges, well known in the art. The use of gasket 90 and hole 94 as shown in FIG. 6 could also be used in this alternative embodiment.

However, a cylinder is the preferred shape since this type of structure is readily available on the market in various sizes and wall thicknesses and thus keeps the cost of manufacture minimized.

As shown in FIG. 6, other options exist for piston 36. The inventor has found that a disk of DELRIN plastic approximately 3.500 inches in diameter and ¾ inches thick is preferable. The use of this material and size for piston 36 enables the apparatus to be constructed inexpensively without compromising performance. The alternative embodiment for piston 36 shown in FIG. 6 features an aluminum disk, again about ¾ inches thick so that piston 36 will not wobble or bind when piston 36 slides inside of charging reservoir 22.

As noted above, air is able to leak past piston 36 in either direction using the preferred embodiment. However, piston 36 could also be configured as a one-way (check) valve by the addition of gasket 90 which is attached to piston 90 via flat washer 92 and bolt 88. A plurality of holes 94 could also be provided in piston 36 to help facilitate airflow in direction 96 but not in the reverse path.

The inventor has discovered that the use of a piston cup, such as manufactured by McMaster Carr of New Brunswick, N.J. 08903, model no. 9411 K27, could be used in place of gasket 90. A piston cup serves to make piston 36 function even more efficiently as a one-way valve in situations where such precision may be desirable.

The resistance of the airflow path from the inflation tank 12 into end 42 must be very small compared to the resistance through the clearance 72. Therefore, piston 36 preferably must be permitted to slide far enough away from end 42 in control section 89 to provide a cross-sectional piston discharge area that is greater than or equal to cross-sectional area of end 42. The inventor has discovered that stroke dimension 78 should be preferably ½ to 1 inch. The minimum stroke dimension 78 that will provide a piston discharge area greater than the cross-sectional area of end 42 of the nipple 38 is easily calculated by dividing the radius of end 42 of nipple 38 squared divided by the diameter of end 42 of nipple 38. As before, if decreased performance is acceptable, then stroke dimension 78 can be reduced accordingly but should be sufficiently long so that the air passageway between piston 36 and end 42 is at least 70% of the cross-sectional open area of end 42.

The inventor has discovered that an essential aspect for successful seating a bead of a tire using this type of apparatus is releasing the stored air as quickly as possible between the rim and the bead of the tire. Therefore, the airflow must not be subjected to unnecessary resistance which will restrict the flow along the path from the air storage tank to the tire. As shown in FIG. 6 of the inventor's U.S. Pat. No. 5,456,302, incorporated herein by reference, the faster the response curve, the more effective the apparatus will be in seating the bead of a tire.

As noted above, the preferable OD dimension for charging reservoir 22 is 3 ¾ inches steel cylinder having a wall thickness of approximately ⅛ inch. This provides an ID of approximately 3.510 inches. However, a smaller ID pipe for charging reservoir 22 could also be used.

A pipe having a two-inch diameter ID such as outlet nipple 38 has a cross-sectional area of approximately 3.14 square inches. Therefore, to prevent the air flow path from having an air flow resistance greater than that of nipple 38, the cross-sectional area of the ID of charging reservoir 22 less the area occupied by the OD of nipple 38 is preferably greater than or equal to 3.14 square inches. Using the ID dimension of charging reservoir 22 and the OD dimension of nipple 38, this yields a cross-sectional area of about 5.24 square inches between the inner wall of charging reservoir 22 and the outer wall of nipple 38, that is, outlet section 87. This is calculated by finding the cross-sectional area of the ID of charging reservoir 22, which is 9.67 square inches and subtracting the cross-sectional area of OD of nipple 38 which is 4.43 square inches, thus yielding 5.24 square inches for outlet section 87.

Clearly, the airflow through this section of the unit has a resistance that is substantially less than that provided by the opening 97 in nipple 38. The ID of charging reservoir 22 could be reduced without detrimentally increasing the resistance of outlet section 87 of charging reservoir 22 as long as the cross-sectional area of charging reservoir 22 was not less than 7.57 square inches. This results in an ID of approximately 3 ⅛ inches for charging reservoir 22. If reduced performance is acceptable, even smaller ID charging reservoirs could be used. However, the cross-sectional area of outlet section 87 should be at least 70% of the cross-sectional area of opening 97 of the charging reservoir 22.

Also, note that the difference between the cross-sectional area of piston 36 and nipple 38 determines the force that holds piston 36 against end 42 of nipple 38. For example, assume that invention 10 is charged with air at a pressure of 100 psi. The force against the control section 89 side of piston 36 is 100 times 9.62 square inches or approximately 960 pounds of force. The force pushing against the outlet section 89 side of piston 36 is 100 times 4.43 square inches (provided by area 75 which was shown above to be the cross-sectional area of the charging reservoir 22 less that cross-sectional area of the OD of nipple 38) plus 14.7 times 3.14 square inches (the cross-sectional area of the ID of outlet nipple 38 which is at atmospheric pressure) or approximately 489 pounds. Therefore, a net force (pressure differential) of approximately 470 pounds is forcing piston 36 against end 42 of nipple 38.

This also explains why invention 10 provides such a fast response time. By rapidly reducing the pressure in control section 89 using quick-release valve 50, the pressure on the outlet section 87 side still remains at approximately 489 pounds thus forcing piston 36 away from end 42. As soon as piston 36 is just slightly away from end 42, the force pushing piston 36 changes to 100 psi over the entire outlet section 87 side of piston 36 or approximately 960. Thus, piston 36 is propelled toward the head plate 34 of charging reservoir 22 permitting the air held within inflation tank 12 to exit explosively via outlet nipple 38 through nozzle 66 and out discharge port 70 (FIG. 3).

To use invention 10, an air hose (not shown) is attached to air coupler 44 and ball valve 46 is opened. Air enters through nipple 52 into charging reservoir 22. Air is entering faster in control section 89 than can leak through clearance 72. Therefore, piston 36 is forced against end 42. Air pressure continues to build up in charging reservoir 22 and continues to leak through clearance 72 causing outlet section 87 of charging reservoir 22 and inflation tank 12 to fill. Once pressure gauge 14 reaches the desired pressure, ball valve 46 is closed and outlet section 87, control section 89 of charging reservoir 22, and inflation tank 12 are substantially at the same pressure. Then, the nozzle 66 of invention 10 is positioned between the bead of a tire and the rim as shown in the referenced FIG. 5 of the '302 patent. Trigger 49 is depressed which causes the air within the control section 89 of charging reservoir 22 to be released from port 54 of quick release valve 50. Piston 36 is then violently propelled toward head plate flange 24, explosively releasing the air in inflation tank 12 into outlet section 87 to exit through nipple 38 and, finally, through nozzle 66 to seat the bead of the tire onto the rim.

While there have been described what are at present considered to be the preferred embodiments of this invention, it will be obvious to those skilled in the art that various changes and modifications may be made therein without departing from the invention and it is, therefore, aimed to cover all such changes and modifications as fall within the true spirit and scope of the invention.

What is claimed is:

1. An apparatus for seating a bead of a tubeless tire on rim comprising:
   a charging reservoir having a control section with a combination fill/quick-release port and an outlet section with an inlet and said charging resevoir also having an outlet, said charging reservoir having a predetermined cross-sectional area;
   an inflation tank having a predetermined volume and pressure, said inflation tank having a combination inlet/outlet, wherein the inlet/outlet of said inflation tank is connected to the inlet of the outlet section of said charging reservoir;
   a piston having a control section side and a outlet section side, said piston moveably disposed within the control section of said charging reservoir, said piston having a cross-sectional area corresponding to the cross-sectional area of the control section of said charging reservoir such that filling the control section of said charging reservoir with pressurized air via the fill/quick-release port, causes said piston to be releasably urged against the outlet of the outlet section of said charging reservoir substantially preventing the pressurized air from exiting the outlet in the outlet section of the charging reservoir while permitting the pressurized air to bypass said piston to fill said inflation tank and the outlet section of said charging reservoir so that air pressure within the outlet and control sections of said charging reservoir and said inflation tank are at substantially the same pressure and wherein quickly releasing the pressurized air within the control section of said charging reservoir via the fill/quick-release port causes said piston to be propelled away from the outlet of said charging reservoir thus releasing the pressurized air stored in said inflation tank to be substantially explosively released through the outlet of the outlet section of said charging reservoir to seat the bead of the tire on the rim.

2. The apparatus of claim 1 further comprising a nozzle having an inlet and an outlet with the inlet of said nozzle being connected to the outlet of the outlet section of said charging reservoir such that when the pressurized air from said inflation tank is released from said inflation tank to said nozzle, the airflow is directed between the bead of the tire and the rim via the outlet of said nozzle, thereby seating the bead of the tire on the rim.

3. The apparatus of claim 1 wherein the pressurized air within the control section of said charging reservoir is released via a quick-release valve.

4. The apparatus of claim 1 wherein the pressurized air within the control section of is said charging reservoir is released via ball-type valve.

5. The apparatus of claim 1 wherein said piston is made from a single piece of plastic.

6. The apparatus of claim 1 wherein said piston is made from metal.

7. The apparatus of claim 1 wherein said piston further comprises a flexible gasket attached at least one side of said piston, wherein said flexible gasket serves to permit airflow to pass in substantially only one direction.

8. The apparatus of claim 7 wherein said piston further comprises a plurality of holes to facilitate air flow from the control section side of said piston to the outlet side of said piston.

9. The apparatus of claim 1 wherein piston further comprises a piston cup which is attached to said piston on the outlet section side such that the piston cup seals said piston against the outlet of said charging reservoir and allows airflow to pass only in the direction from the control section side of said piston to the outlet side of said piston.

10. The apparatus of claim 1 wherein the outlet of said nozzle has a cross-sectional area and the outlet of said charging reservoir has a cross-sectional area such that the cross-sectional area of the outlet of said nozzle is at least 70% of the cross-sectional area of the outlet of said charging reservoir.

11. The apparatus of claim 1 with the outlet section of said charging reservoir having a cross-sectional area and with the outlet of the outlet section of said charging reservoir having a cross-sectional area, such that the cross-sectional area of the outlet section of said charging reservoir must be at least 70% of the cross-sectional area of the outlet of the outlet section of said charging reservoir.

12. The apparatus of claim 1 with the outlet of the outlet section of said charging reservoir having a cross-sectional area and said piston having a stroke dimension which is the distance that said piston is propelled away from the outlet of the outlet section of said charging reservoir, such that the stroke dimension defines a piston discharge area that is at least 70% of the cross-sectional area of the outlet of the outlet section of said charging reservoir.

13. A method for seating a bead of a tubeless tire on a rim comprising the steps of:
   a) providing a control volume, an outlet volume with an outlet and a storage volume, said volumes being dimensioned to contain air at a predetermined pressure and having an airflow passageway communicating between them subject to control by the air pressure within said control volume;
   b) filling the control volume with pressurized air which causes the outlet of said outlet volume to be closed and which causes said outlet volume and said storage volume to be simultaneously filled until said control, outlet, and storage volumes are at the substantially the same predetermined pressure;
   c) selectively rapidly releasing the air pressure within said control volume which correspondingly causes the outlet of said outlet volume to be opened which defines a discharge area;
   d) automatically and substantially instantaneously releasing said storage volume into said outlet volume in response to the release of the air pressure within said control volume to provide essentially a single pneumatic pulse of air into the discharge area and out through the outlet of said outlet volume;
   e) orientating the single pneumatic pulse such that said single pneumatic pulse is directed between the rim and bead of the tubeless tire; wherein the bead of the tire is seated on the rim.

14. The method of claim 13 wherein the outlet of said outlet volume and said outlet volume each have respectively a cross-sectional area with the cross-sectional area of outlet volume corresponding to the cross-sectional area of the outlet of said outlet volume.

15. The method of claim 14 wherein the cross-sectional area of the outlet volume is at least 70% of the cross-sectional area of the outlet of said outlet volume.

16. The method of claim 15 wherein the discharge area is at least 70% of the cross-sectional area of the outlet of said outlet volume.

17. The method of claim 13 wherein the airflow passageway communicating between said control volume and said outlet volume permits air to flow only from said control volume to said outlet volume.

18. An apparatus for seating a bead of a tubeless tire on rim comprising:
   a charging reservoir having a port, an inlet and an outlet;
   a storage tank connected to the inlet of said charging reservoir;
   a control member moveably disposed within said charging reservoir wherein pressurized air introduced into said charging reservoir causes said control member to substantially close the outlet while filling the charging reservoir and the storage tank by air leaking past said control member until a predetermined pressure is reached; and
   wherein quickly releasing the pressure within at least a portion of said charging reservoir causes said control member to be substantially instantaneously propelled away from the outlet of said charging reservoir, thereby permitting the pressurized air stored in said inflation tank to be explosively released through the outlet of said charging reservoir as a substantially single pneumatic pulse which is used to seat the bead of the tire on the rim.

* * * * *